March 29, 1960     H. L. McQUISTON     2,930,158
SIGNAL LIGHT
Filed Aug. 20, 1958
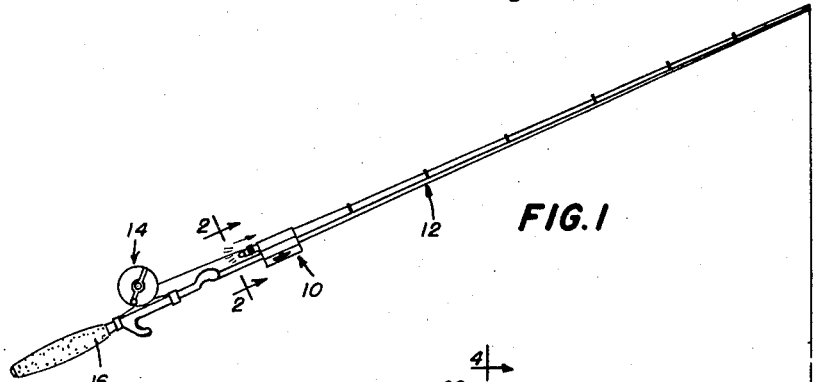
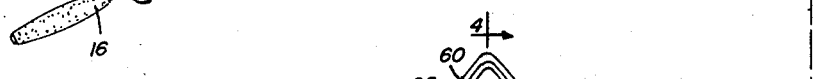
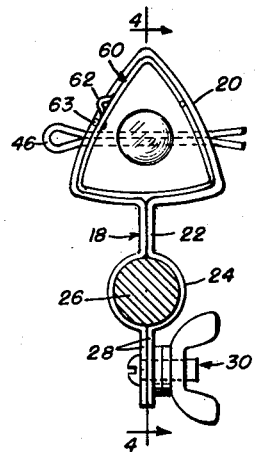
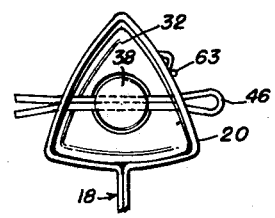
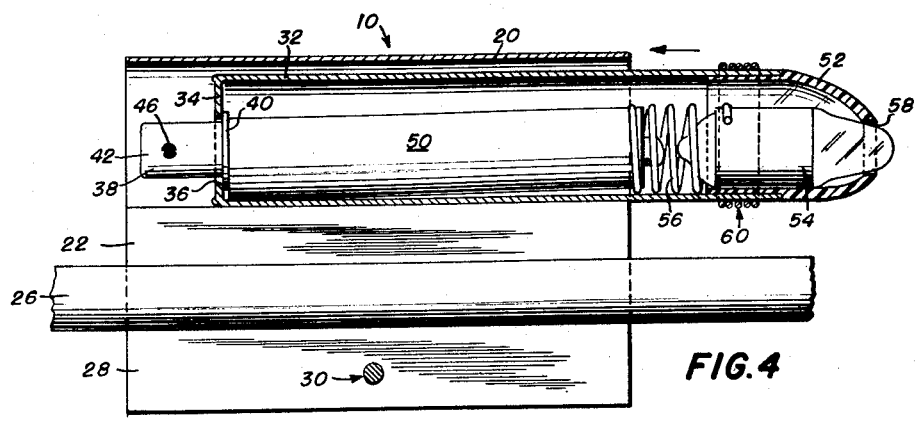
INVENTOR
HORACE L. McQUISTON
BY Leech & Radue
ATTORNEYS

United States Patent Office 2,930,158
Patented Mar. 29, 1960

2,930,158

SIGNAL LIGHT

Horace L. McQuiston, El Dorado, Kans.

Application August 20, 1958, Serial No. 756,103

4 Claims. (Cl. 43—17)

This invention relates to a signal light and more particularly a signal light attachment adapted for use on a fishing rod to indicate when a fish bites.

It is an object of this invention to provide a signal light which is compact, completely reliable and which may be readily attached to a fishing rod.

It is another object to provide a signal light wherein the fishing line is frictionally held so that a pull on the line will close an electric circuit to energize the light bulb.

It is yet another object to provide a signal light in which a pull on the frictionally held line will cause the light bulb to be brought into contact with the battery to energize the bulb.

This invention will appear more clearly from the following detailed description when taken in conjunction with the accompanying drawings, showing by way of example a preferred embodiment, and wherein:

Fig. 1 is an elevational view showing the signal light attachment mounted on a fishing rod ready for use;

Fig. 2 is a vertical cross sectional view taken along line 2—2 of Fig. 1 showing the manner in which the signal light is attached to the fishing rod;

Fig. 3 is an elevational view looking toward the handle end of the rod from a point just forward of the signal light, to show the manner in which the casing is secured to the bracket;

Fig. 4 is a vertical cross sectional view taken along line 4—4 of Fig. 2 showing the details of the signal light; and Fig. 5 is a perspective view of the spring device which fits over the casing and frictionally engages the fishing line.

As best illustrated in Fig. 1 the signal light attachment 10 is secured to the conventional fishing rod 12 beyond the reel 14 in such a manner that the signal light is directed rearwardly toward the handle 16.

As shown in Figs. 2, 3 and 4, the signal light attachment comprises a bracket assembly 18 which includes a sheet metal or plastic member having a triangular hollow body portion 20 with a downwardly extending support 22 from which extends a circular portion 24 adapted to fit around the rod 26. A pair of flange members 28 extend from circular portion 24 and have aligned holes which receive a suitable bolt and nut assembly 30.

A hollow triangular casing 32 is slidably carried within the triangular bracket body 20. The forward end is closed by a wall 34 having a circular opening 36 therein. A flanged plug 38 is positioned through this hole so that the flange 40 will engage the inner face of the wall 34 and the plug portion 42 will extend beyond the wall. A hole extends transversely through the plug portion 42 and receives a cotter pin 46 which extends through and beyond the plug and passes through the adjacent bracket body walls. This arrangement is particularly well illustrated in Fig. 3. The cotter pin 46 is easily removed for dismantling of the unit.

A battery 50 is placed within the casing with one end abutting the flange 40 of plug 38. A transparent cover 52 is frictionally secured to the rear end of the casing 32. A light bulb 54 is positioned within the rear portion of the casing and is held in spaced relation with the battery 50 by means of a coil spring 56 positioned between and engaging the confronting faces of the battery and bulb. The force of the spring is sufficient to push the end of the bulb out into and partially through a hole 58 in the cover 52. It should be noted that the bulb is held in position by means of the spring 56 which forces the bulb end portion into engagement with the periphery of the hole 58.

In view of the above it will be apparent that since the battery 50 abuts the flange 40 of plug 38, the battery is fixed in position while the casing 32 is slidable within the bracket body 20. Since the bulb is fixed in position relative to the casing, it too will move with the casing.

As illustrated in Figs. 4 and 5, a coil spring 60 of triangular shape is fitted over and secured to the casing 32. One coil of the spring has a guide eyelet 62 extending outwardly slightly beyond the outer surface of the remaining coils so when the fishing line 62 is passed under the first coil between the spring and the triangular hollow body portion 32 and over the coil having an eyelet it will frictionally engage the line. The force used to slidably move the casing 32 is transmitted by a pull on the fishing line which is frictionally held by the spring unit 60 secured to the casing 32. This arrangement makes it possible to readily remove the fishing line from the signal light attachment.

In use, the attachment is suitably secured to the fishing rod somewhere beyond the point where the reel is mounted and the fishing line is passed under the first coil and over the second coil and remaining coils to the side of the spring eyelets 60 to frictionally grip the line. When a fish pulls on the line, the casing 32 will slide forwardly as indicated by the arrow in Fig. 4 until the light bulb 54 comes in contact with the stationary battery 50 to energize the bulb. Upon a release of the pull on the line, spring 56 will cause the casing to slide rearwardly to its original position.

In view of the above, it is obvious that the device of this invention presents a signal light attachment which is compact, completely reliable and easy to use.

What I claim as novel and desire to secure by Letters Patent of the United States is:

1. A signal light attachment for use on a fishing rod having a handle portion carrying a reel from which a line is fed through a series of longitudinally spaced guides on the rod, said signal light attachment comprising a casing, a bracket assembly for slidably mounting the casing on the rod, the forward end of the casing having a wall closing that end, said wall having a circular opening therein, a flanged plug fitting in this opening with its flanged portion engaging the inner face of the wall so that the opposite end of the plug will extend outwardly beyond the wall, the plug portion extending beyond the wall being secured to the bracket, a battery positioned within the casing with one end abutting the plug member, a transparent cover secured over the rear end of the casing, said cover having an opening in its rear portion, a light bulb positioned within the rear portion of the casing, a coil spring positioned between and engaging the confronting faces of the battery and bulb to maintain them in spaced relation, said spring pushing the end portion of the bulb out into the opening in the cover, and means on the casing for frictionally engaging the fishing line so that when there is a forward pull on the line the casing will be pulled forward thus forcing the bulb into engagement with the battery which is held stationary by the plug to thereby energize the bulb.

2. The device as set forth in claim 1 wherein the casing is triangular in cross section and the bracket mounting the casing has a similarly shaped portion for slidably carrying the casing.

3. The device as set forth in claim 2 wherein the means on the casing for frictionally engaging the fishing line comprises a coil spring of triangular shape fitting over the rear portion of the casing, one intermediate coil of the spring having a guide eyelet extending slightly beyond the outer surface of the remaining coils so that the fishing line may be placed under the first coil and over the coil having the eyelet and be frictionally held by the first coil forcing the line down against the adjacent coils and casing.

4. A signal light attachment for use on a fishing rod having a handle portion carrying a reel from which a line is fed through a series of longitudinally spaced guides on the rod, said signal light attachment comprising a triangular casing, a bracket assembly for slidably mounting the casing, said assembly comprising a triangular hollow body generally conforming to the shape of the casing carried within, and means extending therefrom to secure the assembly to the rod; the forward end of the casing having a wall closing that end, said wall having a circular opening therein, a flanged plug fitting in this opening with its flanged portion engaging the inner face of the wall so that the opposite end of the plug will extend outwardly beyond the wall, the plug portion extending beyond the wall having a transverse hole, a removable pin fitting through said hole and secured to the adjacent bracket sides, a battery positioned within the casing so that one end abuts the flanged plug, a transparent cover positioned over the rear end of the casing, said transparent cover having an opening in its rear portion, a light bulb positioned within the rear portion of the casing, a coil spring positioned between and engaging the confronting faces of the battery and bulb to maintain them in spaced relation, said spring having sufficient force to push the end portion of the bulb outwardly into the opening in the transparent cover, and a coil spring of triangular shape fitting over the rear portion of the casing, one intermediate coil of the spring having a guide eyelet extending slightly beyond the outer surface of the remaining coils so that the fishing line may be placed under the first coil and over the coil having the eyelet and be frictionally held by the first coil forcing the line down against the adjacent coils and casing, whereby when there is a forward pull on the line the casing will be pulled forward thus forcing the bulb into engagement with the battery which is held stationary by the flanged plug to thereby energize the bulb.

References Cited in the file of this patent

UNITED STATES PATENTS

| | | |
|---|---|---|
| 2,171,304 | Gelardin | Aug. 29, 1939 |
| 2,530,050 | Evans | Nov. 14, 1950 |
| 2,616,202 | Romberger | Nov. 4, 1952 |
| 2,714,152 | Ackerman et al. | July 26, 1955 |
| 2,722,076 | Benedetti | Nov. 1, 1955 |